US012670026B2

(12) United States Patent
Hamlin et al.

(10) Patent No.: US 12,670,026 B2
(45) Date of Patent: Jun. 30, 2026

(54) WORKSPACE PERIPHERAL ACCESS AND MANAGEMENT POLICY

(71) Applicant: Dell Products, L.P., Round Rock, TX (US)

(72) Inventors: Daniel L. Hamlin, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1081 days.

(21) Appl. No.: 17/468,332

(22) Filed: Sep. 7, 2021

(65) Prior Publication Data

US 2023/0072152 A1     Mar. 9, 2023

(51) Int. Cl.
*G06F 9/50* (2006.01)
*G06F 9/455* (2018.01)

(52) U.S. Cl.
CPC ........ *G06F 9/5027* (2013.01); *G06F 9/45558* (2013.01); *G06F 2009/4557* (2013.01); *G06F 2009/45579* (2013.01); *G06F 2221/2141* (2013.01)

(58) Field of Classification Search
CPC ............... G06F 9/5027; G06F 9/45558; G06F 2009/4557; G06F 2009/45579
See application file for complete search history.

(56) References Cited

U.S. PATENT DOCUMENTS

| | | | | |
|---|---|---|---|---|
| 6,466,982 B1* | 10/2002 | Ruberg | ..................... | G06F 9/52 |
| | | | | 709/227 |
| 8,533,775 B2* | 9/2013 | Alcorn | ................ | G06F 21/6218 |
| | | | | 726/4 |
| 8,561,142 B1* | 10/2013 | Sobel | .................... | H04L 63/107 |
| | | | | 713/156 |
| 8,769,268 B2* | 7/2014 | Morozov | ................ | G06F 21/74 |
| | | | | 718/107 |
| 8,918,834 B1* | 12/2014 | Samuelsson | ............ | H04L 63/20 |
| | | | | 726/1 |
| 9,923,927 B1* | 3/2018 | McClintock | ........ | H04L 63/0846 |
| 11,029,771 B1* | 6/2021 | Iyer | ..................... | G06F 3/04886 |
| 11,290,458 B1* | 3/2022 | Iyer | ........................ | G06F 13/102 |
| 12,210,643 B2* | 1/2025 | Grobelny | ............ | G06F 21/6218 |
| 12,432,216 B2* | 9/2025 | Grobelny | .............. | H04L 63/102 |
| 2003/0212709 A1* | 11/2003 | De Schrijver | ........... | G07C 9/37 |
| 2006/0005254 A1* | 1/2006 | Ross | ........................ | H04L 63/08 |
| | | | | 726/27 |
| 2008/0222663 A1* | 9/2008 | Carpenter | ............. | G06F 12/145 |
| | | | | 726/1 |

(Continued)

*Primary Examiner* — Benjamin C Wu
(74) *Attorney, Agent, or Firm* — Fogarty LLP

(57) ABSTRACT

Systems and methods for managing workspaces across multiple clients are described. In some embodiments, a Workspace Managing Device (WMD) may include a processor and a memory coupled to the processor, the memory having program instructions stored thereon that, upon execution, cause the WMD to: receive a request from a client Information Handling System (IHS) to access a peripheral device coupled to the WMD; identify a workspace management policy applicable to at least one of: the request, the peripheral device, the client IHS, or a user of the client IHS; and manage access to the peripheral device by the client IHS based upon the workspace management policy.

17 Claims, 4 Drawing Sheets

(56)                References Cited

U.S. PATENT DOCUMENTS

| | | | | |
|---|---|---|---|---|
| 2009/0144465 | A1* | 6/2009 | Sato | G06F 21/78 |
| | | | | 710/37 |
| 2009/0172770 | A1* | 7/2009 | Sandage | G06Q 30/06 |
| | | | | 726/1 |
| 2011/0202689 | A1* | 8/2011 | Koenig | G06F 3/038 |
| | | | | 710/9 |
| 2011/0202750 | A1* | 8/2011 | Creasey | G06F 3/02 |
| | | | | 713/1 |
| 2012/0297455 | A1* | 11/2012 | Novak | G06F 21/6218 |
| | | | | 726/4 |
| 2012/0303827 | A1* | 11/2012 | Neystadt | G06F 21/6218 |
| | | | | 709/229 |
| 2012/0311696 | A1* | 12/2012 | Datsenko | G06F 21/6218 |
| | | | | 726/17 |
| 2013/0304641 | A1* | 11/2013 | Dabbiere | G06F 21/82 |
| | | | | 705/40 |
| 2013/0311684 | A1* | 11/2013 | Dabbiere | G06F 13/385 |
| | | | | 710/36 |
| 2015/0277949 | A1* | 10/2015 | Loh | G06F 9/45558 |
| | | | | 718/1 |
| 2015/0363613 | A1* | 12/2015 | O'Dowd | G06F 21/83 |
| | | | | 726/26 |
| 2017/0185462 | A1* | 6/2017 | Cox | G06F 13/4081 |
| 2017/0220489 | A1* | 8/2017 | Ahmed | G06F 13/28 |
| 2017/0293577 | A1* | 10/2017 | Gomzin | H04W 12/50 |
| 2018/0041543 | A1* | 2/2018 | Rahardjo | H04L 63/08 |
| 2018/0322090 | A1* | 11/2018 | Tamir | G06F 11/3006 |
| 2018/0349629 | A1* | 12/2018 | Chenchev | G06F 21/568 |
| 2018/0367568 | A1* | 12/2018 | Martinez | H04L 63/0272 |
| 2019/0103976 | A1* | 4/2019 | Chhabra | G06F 21/00 |
| 2019/0116497 | A1* | 4/2019 | Veramendi | G06F 9/4411 |
| 2019/0297084 | A1* | 9/2019 | Li | G06F 9/445 |
| 2021/0021600 | A1* | 1/2021 | Ojha | H04L 63/102 |
| 2021/0103276 | A1* | 4/2021 | Gadhe | G06F 16/953 |
| 2021/0306348 | A1* | 9/2021 | Ratiner | G06F 21/62 |
| 2022/0004623 | A1* | 1/2022 | Trabelsi | H04L 63/029 |
| 2022/0027522 | A1* | 1/2022 | Kasheshian | G06F 21/83 |
| 2022/0245071 | A1* | 8/2022 | Vajravel | G06F 13/385 |
| 2023/0025808 | A1* | 1/2023 | Gupta | H04L 63/10 |
| 2023/0035594 | A1* | 2/2023 | Iyer | G06F 9/52 |
| 2023/0072152 | A1* | 3/2023 | Hamlin | G06F 21/629 |
| 2023/0076376 | A1* | 3/2023 | Hoel | H04L 63/029 |
| 2024/0241838 | A1* | 7/2024 | Andrews | G06F 8/65 |
| 2024/0242138 | A1* | 7/2024 | Dhoble | G06Q 10/063 |
| 2024/0249010 | A1* | 7/2024 | Grobelny | G06F 21/577 |
| 2024/0250953 | A1* | 7/2024 | Robison | H04L 63/20 |
| 2025/0252194 | A1* | 8/2025 | Grobelny | G06F 21/6254 |
| 2025/0252196 | A1* | 8/2025 | Dhoble | G06F 21/82 |
| 2025/0252201 | A1* | 8/2025 | Dhoble | G06F 21/6218 |
| 2025/0252202 | A1* | 8/2025 | Andrews | G06Q 10/06314 |

* cited by examiner

100

103

WORKSPACE PERIPHERAL ACCESS AND MANAGEMENT POLICY

FIELD

This disclosure relates generally to Information Handling Systems (IHSs), and, more specifically, to systems and methods for managing workspaces across multiple clients.

BACKGROUND

As the value and use of information continues to increase, individuals and businesses seek additional ways to process and store it One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The inventors hereof have recognized that users of multiple IHSs (e.g., work, personal, etc.) often share the same peripheral devices (e.g., keyboard, mouse, display, dock, etc.) between their IHSs, which can create a vast number of workspace configuration problems.

Existing mechanisms for helping a user operate different IHSs with appropriate peripheral devices are not easy or intuitive. One such mechanism is the Keyboard, Video and Mouse (KVM) switch, but that type of solution fails to address manageability and security issues that can arise when changes are made to workspace configurations. To address these, and other concerns, the inventors have developed systems and methods for managing workspaces across multiple clients.

SUMMARY

Systems and methods for managing workspaces across multiple clients are described. In an illustrative, non-limiting embodiment, a Workspace Managing Device (WMD) may include a processor and a memory coupled to the processor, the memory having program instructions stored thereon that, upon execution, cause the WMD to: receive a request from a client Information Handling System (IHS) to access a peripheral device coupled to the WMD; identify a workspace management policy applicable to at least one of: the request, the peripheral device, the client IHS, or a user of the client IHS; and manage access to the peripheral device by the client IHS based upon the workspace management policy.

The WMD may include at least one of a dock or a display, and the workspace management policy may be received by the dock or the display from a remote service. To identify the workspace management policy, the program instructions, upon execution, further cause the WMD to select the workspace management policy among a plurality of policies based upon context information.

For example, the context information may include at least one of: a type of WMD, a location of the WMD, or a service tag of the WMD. Additionally, or alternatively, the context information may include at least one of: a type of client IHS, a service tag of the client IHS, a posture of the client IHS, an identity of the user of the client IHS, or a proximity of the user of the client IHS. Additionally, or alternatively, the context information comprises an indication of whether the peripheral device is accessible to at least one other client IHS. Additionally, or alternatively, the context information may include a type of workload executed by the client IHS.

The type of workload may include at least one of: a software-based container or a hardware-based container. To manage the connection request, the program instructions, upon execution, further cause the WMD to allow or deny access to the peripheral device by the client IHS. Moreover, to manage access to the peripheral device, the program instructions, upon execution, further cause the WMD to allow access to a first feature of the peripheral device and to deny access to a second feature of the peripheral device. For instance, at least one of the first or second features may include at least one of: a network connection or a type of hard drive access operation.

The program instructions, upon execution, may cause the WMD to allow or deny access to a given feature of the peripheral device based upon context information. Additionally, or alternatively, the program instructions, upon execution, may cause the WMD to, in response to a determination of whether the client IHS is a work IHS or a personal IHS, grant or deny access to the peripheral device. Additionally, or alternatively, the program instructions, upon execution, may cause the WMD to, in response to a determination of whether the client IHS is a work IHS or a personal IHS, provide restricted access to the peripheral device.

The peripheral device may include at least one of: a display, a mouse, a keyboard, a hard drive, a microphone, or a camera. The request to access the peripheral device may include a request to access any or all peripheral devices coupled to the WMD, and to manage access to the peripheral device, the program instructions, upon execution, may cause the WMD to select a subset of all peripheral devices coupled to the WMD made at least partially accessible to the client IHS in response to enforcement of the workspace management policy against context information.

In another illustrative, non-limiting embodiment, a memory storage device may have program instructions stored thereon that, upon execution by an IHS, cause the IHS to: receive a request from another IHS to access a peripheral device coupled to the IHS; and manage access to the peripheral device using a workspace management policy. The workspace management policy may identify a level of access granted to the other IHS with respect to the peripheral device based upon context information.

In another illustrative, non-limiting embodiment, a method may include: receiving, at a WMD, a workspace management policy; and managing access to a plurality of peripheral devices by a plurality of client IHSs by the WMD based upon a workspace management policy that identifies a level of access granted to at least one of the plurality of client IHSs with respect to at least one of the plurality of peripheral devices based upon context information. The context information may include an indication of whether a workload executed by the at least one of the plurality of client IHSs comprises a software-based container or a hardware-based container.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
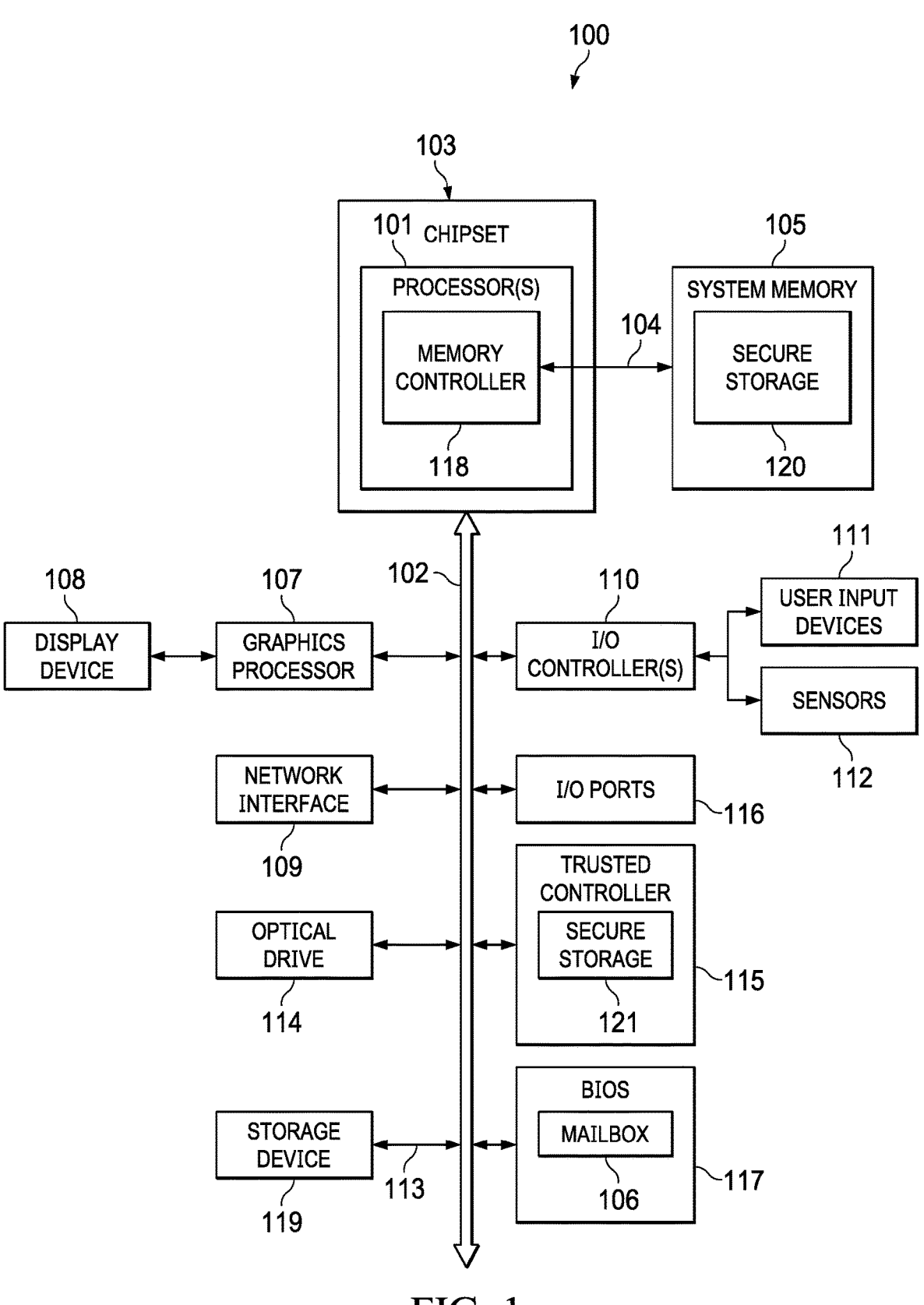
FIG. 1 is a diagram depicting examples of components of an Information Handling System (IHS), according to some embodiments.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 is a diagram depicting components of an example IHS 100 configured to manage workspaces across multiple clients. As shown, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing functions.

Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA. In the embodiment of FIG. 1, processor(s) 101 includes an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 that is coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory.

In certain embodiments, system memory 105 includes secure storage 120 that may be a portion of the system memory designated for storage of information, such as access policies, component signatures, encryption keys, and other cryptographic information, etc. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a component of chipset 103. In other embodiments, all of chipset 103, or portions of chipset 108 may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that is coupled to IHS 100 and allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In certain embodiments, network interface 109 may support connections between a trusted IHS component, such as trusted controller 115, and a remote orchestration service. In such embodiments, a connection supported by network interface 109 between the remote orchestration service and the trusted component may be considered an out-of-band (OOB) connection that is isolated from an operating system (OS) of the IHS.

Chipset 102 may also provide access to one or more display device(s) 108 via graphics processor 107. In certain embodiments, graphics processor 107 may be comprised within one or more video or graphics cards or an embedded controller installed as components of IHS 100. Graphics processor 107 may generate display information and provide the generated information to one or more display device(s) 108 coupled to IHS 100, where display device(s) 108 may include integrated display devices and/or external display devices coupled to IHS, such as via an I/O port 116, where display device(s) 108 may include integrated display devices and/or external display devices coupled to IHS. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. User input devices 111 may interface with I/O controller 110 through wired or wireless connections. Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.).

In some cases, chipset 103 may include a sensor hub capable of utilizing information collected by sensors 112 in determining the relative orientation and movement of IHS 100. For instance, the sensor hub may utilize inertial movement sensors, that may include accelerometer, gyroscope, and magnetometer sensors, and are capable of determining the orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub may also include capabilities for determining a location and movement of IHS 100 based on triangulation of network signal and based on network information provided by the OS or network interface 109. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, and/or facing integrated display 108.

In cases where the end-user is present before IHS 100, the sensor hub may further determine a distance of the end-user from the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B).

In embodiments where IHS 100 may support multiple physical configurations, such as a convertible laptop, N-in-1 device, or the like, the sensor hub may utilize one or more mode sensors 112 that collect readings that may be used in determining the posture in which IHS 100 is physically configured. In certain embodiments, such posture determinations may be additionally made using the movement and orientation information provided by sensors 112. In laptop and convertible laptop embodiments, for example, processor 101 or trusted controller 115 may utilize a lid position sensor 112 to determine the relative angle between the two panels of the laptop in order to determine the mode in which IHS 100 is physically configured. In such embodiments, the lid position sensor may measure the angle of rotation of the hinge that connects the base panel and lid panel of IHS 100. In some embodiments, processor 101 or trusted controller 115 may provide collected lid position information, such as the hinge angle, to the sensor hub for use in determining the posture in which IHS 100 is configured. In some embodiments, the sensor hub may interface directly with the lid position sensor in determining hinge angle information.

The sensor hub may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. The sensor hub may additionally utilize orientation and movement information collected from inertial movement sensors 112 to further determine the posture in which IHS 100 is physically configured. For instance, if the sensor hub determines that IHS 100 is configured with a hinge angle of a laptop configuration, but IHS 100 is oriented on its side, the IHS may be determined to be in a book mode. If IHS 100 is determined to be tilted such that the hinge is oriented between horizontal and vertical, the user's face is detected to be facing the integrated display, and IHS 100 is experiencing slight movement, the sensor hub may determine that IHS 100 is being used in a book posture. The sensor hub may determine that IHS 100 is opened to a 180-degree hinge angle and lies on a flat surface, thus indicating that IHS 100 it is being used in a landscape posture. The sensor hub may similarly determine that IHS 100 is in a tent configuration, in response to detecting a hinge angle within a defined range, such as between 300 and 345 degrees, and also detecting an orientation of IHS 100 where the hinge is aligned horizontally and is higher than both of the display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via an I/O port 116 may include storage devices that support transfer of data to and from system memory 105 and/or storage devices 119 of IHS 100. Access to storage devices via an I/O port 116 may result in a change in the security profile of IHS 100.

Chipset 103 also provides processor(s) 101 with access to one or more storage devices 119. In various embodiments, storage device 119 may be integral to IHS 100, or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some embodiments, storage device 119 may be a system of storage devices, such as a cloud drive accessible via network interface 109.

As illustrated, IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. Upon execution, BIOS 117 instructions may facilitate the loading of an OS (e.g., WINDOWS, MACOS, iOS, ANDROID, LINUX, etc.) for use by IHS 100. BIOS 117 provides an abstraction layer that allows the OS to interface with the hardware components of IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiment, BIOS 117 includes a pre-defined memory or memory region that may be referred to as NVM (Non-Volatile Memory) mailbox 106. In such an implementation, mailbox 106 may provide a secured storage location for use in storing access policies, signatures, cryptographic keys, or other data. In certain embodiments, BIOS mailbox 106 may be utilized as a secure storage utilized by a remote orchestration service in order to store access policies and cryptographic keys for use in delivering and deploying a secured container on IHS 100. BIOS mailbox 106 and secured storage 120 in system memory 105 may be utilized in this manner instead of, or in conjunction with, out-of-band functions implemented by trusted controller 115.

In certain embodiments, trusted controller 115 is coupled to IHS 100. For example, trusted controller 115 may be an embedded controller (EC) that is installed as a component of the motherboard of IHS 100. Trusted controller 115 may be additionally configured to calculate signatures that uniquely identify individual components of IHS 100. In such scenarios, trusted controller 115 may calculate a hash value based on the configuration of a hardware and/or software component coupled to IHS 100. For instance, trusted controller 115 may calculate a hash value based on all firmware and other code or settings stored in an onboard memory of a hardware component, such as a network interface 109. Such hash values may be calculated as part of a trusted process of manufacturing IHS 100 and may be maintained in the secure storage 121 as a reference signature.

Trusted controller 115 may be further configured to recalculate a hash value at a later time for such a component. The hash value recalculated for the component may then be compared against the reference hash value signature to determine if any modifications have been made to a component, thus indicating the component has been compromised. In this manner, trusted controller 115 may be used to validate the integrity of hardware and software components installed on IHS 100.

Trusted controller 115 may also implement operations for interfacing with a power adapter in managing power for IHS 100. Such operations may be utilized to determine the power status of IHS 100, such as whether IHS 100 is operating from battery power or is plugged into an AC power source. Firmware instructions utilized by trusted controller 115 may be used to operate a secure execution environment that may include operations for providing various core operations of IHS 100, such as power management and management of certain modes of IHS 100 (e.g., turbo modes, maximum operating clock frequencies of certain components, etc.).

In managing modes of IHS 100, trusted controller 115 may implement operations for detecting certain changes to the physical configuration of IHS 100 and managing the modes corresponding to different physical configurations of IHS 100. For instance, where IHS 100 is a laptop computer or a convertible laptop computer, trusted controller 115 may receive inputs from a lid position sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

IHS 100 may support the use of various power modes. In some embodiments, the power modes of IHS 100 may be implemented through operations of trusted controller 115 and/or the OS of IHS 100. In various embodiments, IHS 100 may support different reduced power modes in order to reduce power consumption and/or conserve battery power when IHS 100 is not actively in use, and/or to control a level of performance available to the user by increasing or decreasing a maximum operating clock frequency of a component of IHS 100 (e.g., processor(s) 101).

For example, in some implementations, a low-power mode of operation may include the S0 low-power idle model, also known as Modern Standby or Connected Standby, which provides an instant on/off user experience and maintains a network connection for certain processes while consuming very little power. These types of power modes may be entered, for example, when IHS 100 transitions into standby (e.g., "sleep," etc.).

In various embodiments, IHS 100 may be coupled to one or more peripheral devices via a Workspace Managing Device (VMD) such as a dock, docking station, intelligent hub, external display, wireless KVM, or other IHS. Examples of peripheral devices include, but are not limited to: keyboards, mice, touchscreens, touchpads, trackpads, trackballs, pen tablets, joysticks, MIDI keyboards, scanners, cameras, microphones, biometric sensors, monitors, projectors, TVs, printers, plotters, speakers, external hard drives, media card readers, digital camcorders, digital mixers, MIDI equipment, etc.

The term "workspace," as used herein, generally refers to a combination of peripheral device(s) and/or configuration(s) thereof, such as specific peripheral device features or capabilities (e.g., read/write permission, network/physical transport access, etc.) that may be available to a given IHS (e.g., through a WMD).

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Figure 2:
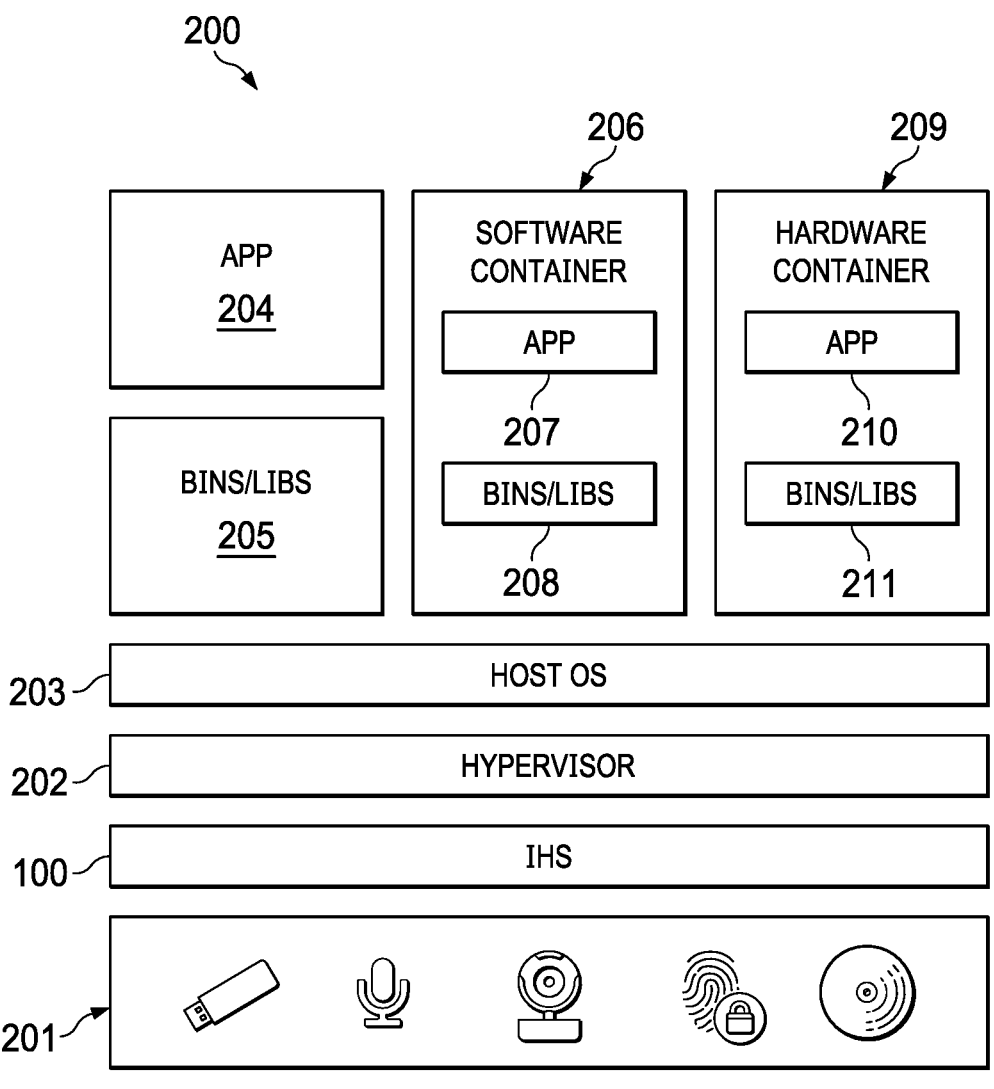
FIG. 2 is a diagram of an example of a heterogeneous workload environment, according to some embodiments.

FIG. 2 is a diagram of an example of heterogeneous workload environment 200 executable by IHS 100 or the like. In environment 200, peripheral devices 201 may include, for example, input devices 111 (e.g., mice, keyboard, etc.), sensors 112 (e.g., cameras, microphones, etc.), optical drives 114, I/O ports 116, etc. In this implementation, hypervisor 202 is shown as a type-1, native, or bare-metal hypervisor running directly on IHS 100 to manage host OS 203. In other implementations, however, hypervisor 202 may be a type-2 or hosted hypervisor running on top of host OS 203.

To produce and/or manage a first type of workload, hypervisor 202 may support host OS 203, which in turn enables native application 204 to execute using binary files and/or library files (bins/libs) 205. Additionally, or alternatively, to produce and/or manage a second type of workload, hypervisor 202 may instantiate software-based container 206 (e.g., a Virtual Machine (VM), docker, snap, Progressive Web App (PWA), Virtual Desktop Integration (VDI), etc.) through host OS 203, where application 207 executes using container bin/libs 208. Additionally, or alternatively, to produce and/or manage a third type of workload, hypervisor 202 further may instantiate hardware-based container 209 (e.g., Hyper-V, INTEL Clear Container, etc.) where application 210 executes using container bin/libs 211.

In some implementations, software-based container 206 may be configured to execute applications or workloads that do not require a high level of security, for example, because they are trusted, such as application 207. Conversely, hardware-based container 209 may be configured to execute applications or workloads that do require a high level of security, for example, because they are untrusted, such as application 210. Additionally, or alternatively, hardware-based container 209 may be configured to execute applications that require an OS different than host OS 203.

In some embodiments, when applications are distributed and/or deployed from a trusted source, software-based container 206 may be used as it generally has less overhead and provides higher containerized application density. Conversely, when applications are distributed and/or deployed from an untrusted source, hardware-based and/or hypervisor-isolated hardware-based container 209 may be used, despite presenting a higher overhead, to the extent it provides better isolation or security.

Software-based container 206 shares the kernel of host OS 203 and UEFI services, but access is restricted based upon the user's privileges. Hardware-based container 209 has a separate instance of OS and UEFI services. In both cases, containers 206 and 209 serve to isolate applications from host OS 203 and other applications.

With respect to workspaces, in systems and methods described herein, different types of containers 206 or 209 may have different levels of access (e.g., granted, denied, or restricted) to selected peripheral devices and/or features thereof via a WMD. For example, a hard drive (or any other peripheral device) coupled to a dock or display may be accessible to a first IHS (e.g., a user's work laptop) running hardware-based container 209 but not to a second IHS (e.g., the user's personal device) running software-based container 206. Additionally, or alternatively, the hard drive may provide both read and write access to the first IHS and read-only access to the second IHS, further in response to other contextual information.

In various embodiments, systems and methods described herein may facilitate workspace compatibility by enabling interoperability between clients, docks, and/or other ecosystem devices (e.g., a display serving as hub as to one or more peripheral devices) while enabling contextual security, manageability, and compliance, and promoting increased end-user productivity in commercial environments. Particularly, systems and methods described herein may enable intelligently detecting peripheral devices, creating logical workspace(s), and/or selectively transitioning between different workspaces in a managed and secure fashion based on contextual information (e.g., type of user, identity of user, proximity of a user, type of IHS, identity of IHS, IHS location, type of workload executed, type of WMD, location of the WMD, types of peripheral devices and capabilities coupled to the WMD, time-of-day, calendar information, meeting information, identity of other users or IHSs with access to the same peripheral devices or WMD, etc.).

As an example, using systems and methods described herein, a user may have two IHSs at his desk in the office. A first IHS may be a protected IHS connected to a secure "red" network while the second IHS may be connected to an unsecure or open "blue" network. Using systems and methods described herein, a WMD such as a dock may automatically provide different network access to each IHSs while both IHSs share other available resource(s).

As another example, a user may have an IHS running containers of different types. When a work container (e.g., hardware-based) application or workload is loaded, systems and methods described herein may: provide the IHS with access to a first set of peripheral devices and/or capabilities, and/or deny the IHS access to a second set of peripheral devices and/or capabilities. Conversely, when a personal container (e.g., software-based) application or workload is loaded, systems and methods described herein may: provide the IHS with access to a second set of peripheral devices and/or capabilities, and/or deny the IHS access to the first set of peripheral devices and/or capabilities.

As still another example, a user may share an IHS with another person. Using systems and methods described herein, the user may configure a WMD such as a dock to allow access to a hard drive connected thereto only in response to certain conditions being met, such as his presence and/or proximity with respect to the IHS.

As yet another example, two users may be working in an office with a shared resource pool. Each user directly connects to the peripheral devices available in the resource pool, and each is allowed to access a resource independently of the other. Using systems and methods described herein, each user may generate access to resources that are not required to be isolated (e.g., network, etc.) if they are in communication with each other (e.g., wirelessly).

As still another example, a user may be working at a particular worksite or location. The user may connect his personal external drive to a docking station. Using systems and methods described herein, the docking station may determine that it is within a corporate environment and/or it may detect credentials on the user's IHS to create a workspace that allows access to the external drive while restricting it from being accessed over the network.

In some cases, an organization's IT department may grant users access to multiple IHSs without the security issues that can arise from connecting corporate devices like USB drives to personal IHSs. For example, using systems and methods described herein, an IT decision maker (ITDM) may deploy a workspace management policy to an aggregation device which can then be locally enforced to whitelist/blacklist peripheral devices and/or selected actions, including access to certain networks, read/write hard drive operations, etc., for example, based upon a user's identity, an IHS service tag, or the like.

Figure 3:
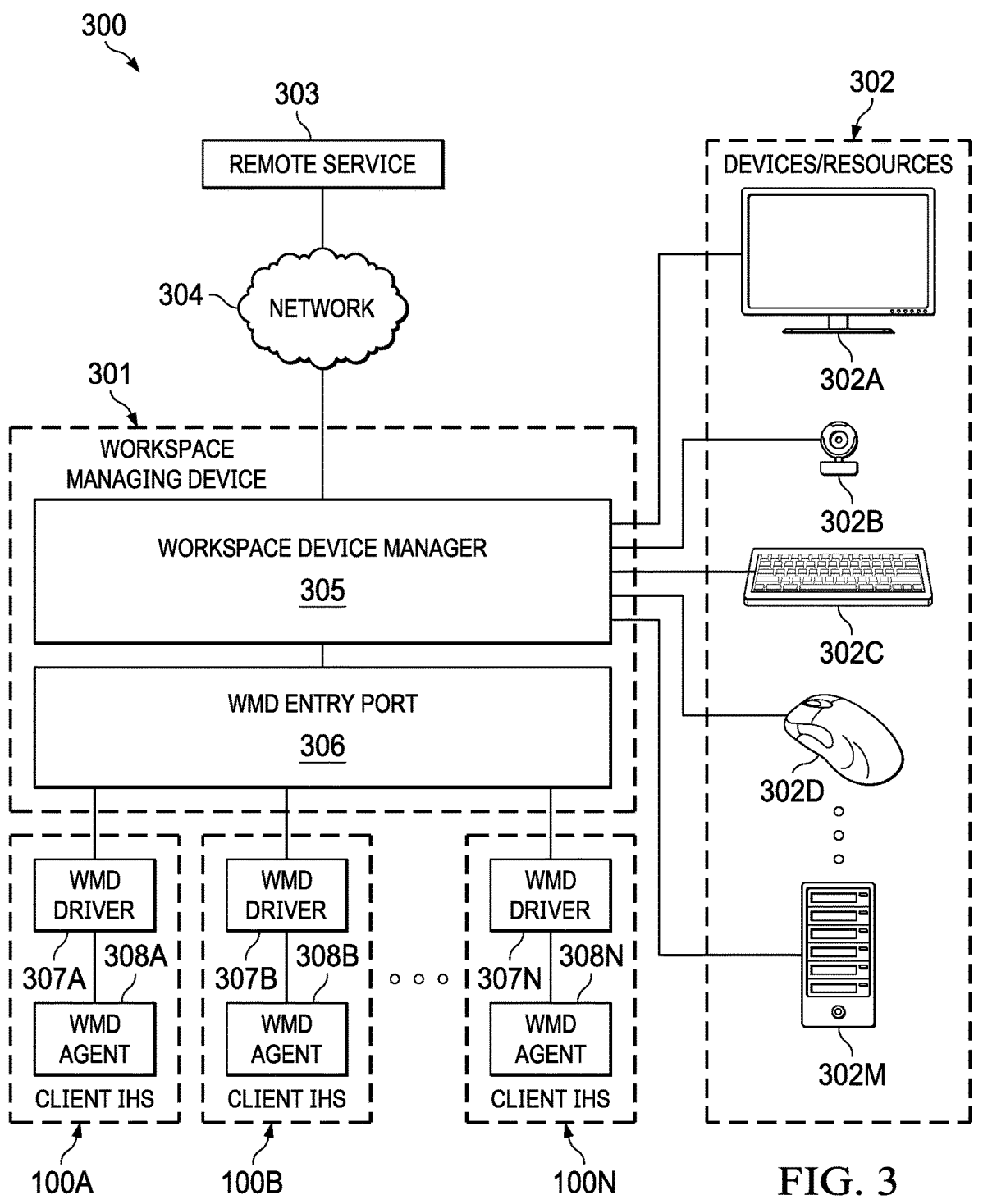
FIG. 3 is a diagram of an example of a system for managing workspaces across multiple clients, according to some embodiments.

FIG. 3 is a diagram of an example of system 300 for managing workspaces across multiple client IHSs 100A-N. In some embodiments, WMD 301 may include a dock, display, hub, IHS, etc. having wired (e.g., USB, Ethernet, etc.) or wireless (e.g., BLUETOOTH, WiFi, etc.) connections to a plurality of peripheral devices 302A-M (collectively "302").

Client IHSs 100A-N connect to WMD 301 through WMD entry port 306. Each of client IHSs 100A-N includes a respective WMD agent 308A-N in communication with Workspace Device Manager (WDM) 305 via corresponding WMD drivers 307A-N. WMD 301 is also coupled to remote service 303 via network 304 (e.g., the Internet). In some cases, remote service 303 may include a repository of workspace management policies. Additionally, or alternatively, remote service 303 may include IT tools for distributing such policies to relevant WMDs.

On the client IHS 100A-N side, WMD agents 308A-N may be implemented as a service configured to: receive workspace management policies tied to context provided from remote service 303, send periodic context information and/or telemetry data to remote service 303, provide client IHS-based service initiated with a device driver and/or API connection to WDM 305, provide client IHS-based application tied to WDM 305, perform IHS and/or WMD verification and assertion operations, transfer hotkeys or workspace transition commands to WDM 305, and/or end system status/connection readiness to WDM 305 to modify workspace identification.

On the WMD 301 side, WDM 305 may be implemented as a service configured to: workspace management policies tied to context provided from remote service 303, send periodic context information and/or telemetry data to remote service 303, filter peripheral devices, detect connections, create workspaces, detect IHS connections and initiate an IHS-to-WMD connection that provides an IHS with access to resources as defined by an applicable workspace management policy based on context, perform cycle changes between IHSs, for example, based on WMD 301 connected defined hotkey to initiate toggle or an IHS connected command via host-based application, etc. Examples of cycle changes may include: disconnect, cycle to next workspace, cycle to a specific workspace, and/or modifies a workspace based on arrival of new connected device (e.g., preferred application/locations/positions/sizes, etc.).

WDM 305 may include a connected device manager module coupled to peripheral devices 302 and a connection service module coupled to the plurality of client IHSs 100A-N. Moreover, WDM 305 may include a manageability policy and encryption key manager module and a corresponding database configured to perform various operations described in FIG. 4. In various implementations, communications between WMD agents 308A-N and WDM 305 may follow include key exchange processes or other cryptographic techniques to enable secure communications between them.

Remote service 303 may be instantiated as a manageability back-end service (e.g., on-premises or hybrid cloud) configured to: push workspace management policies to WMD 301 and/or client IHSs 100A-N, receive context information from WMD 301 and/or client IHSs 100A-N, calculate and push updated workspace management policies to WMD 301 and/or client IHSs 100A-N, etc. In some cases, a workspace management policy may be applied or selected based on an IHS service tag or the like.

Figure 4:
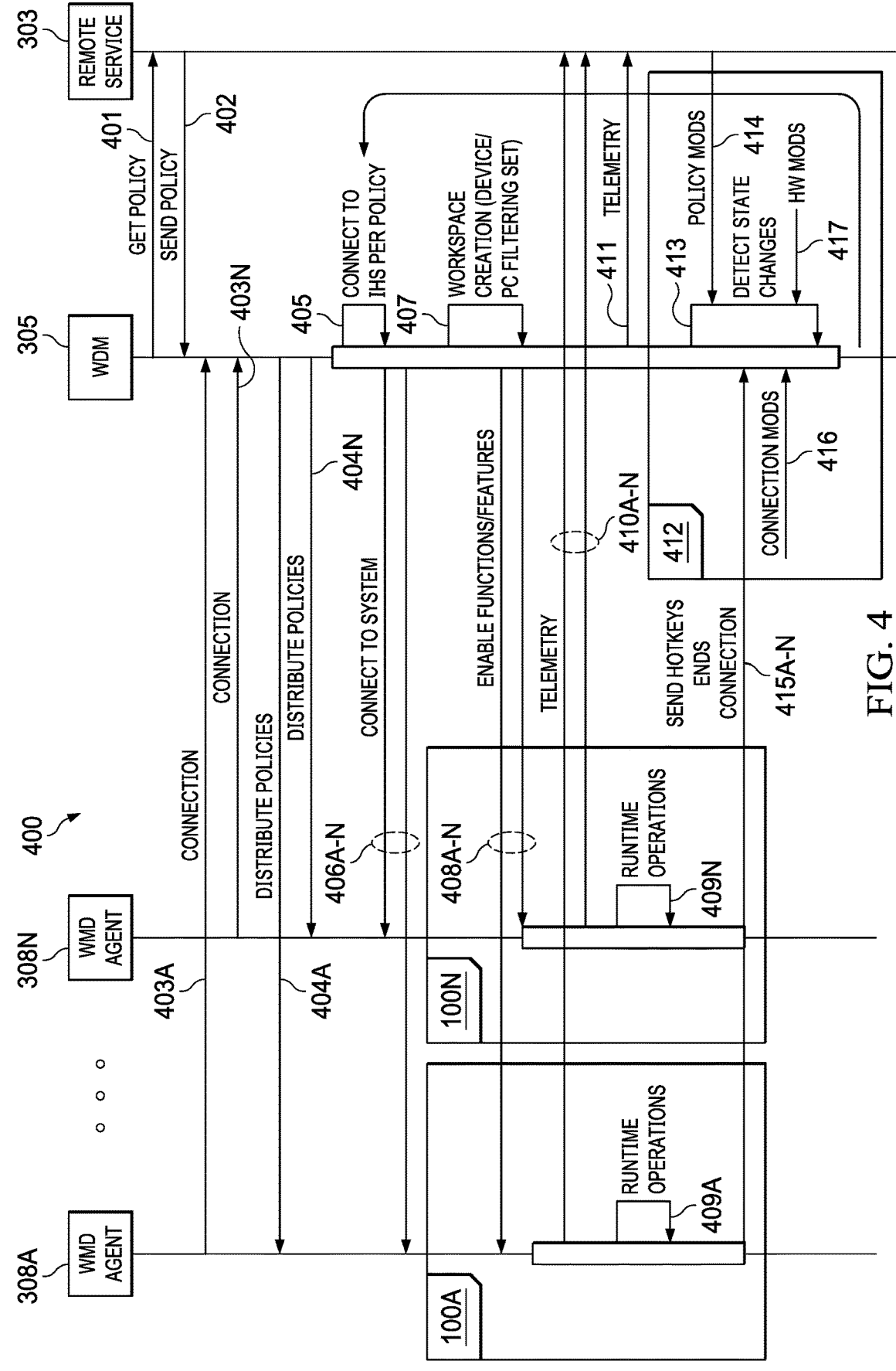
FIG. 4 is a diagram of an example of a method for managing workspaces across multiple clients, according to some embodiments.

FIG. 4 is a diagram of an example of method 400 for managing workspaces across multiple client IHSs 100A-N. In some embodiments, method 400 may be performed, at least in part, by WDM 305 (within WMD 301), WMD agents 308A-N of client IHSs 100A-N, peripheral devices 302, and/or remote service 303, as shown in FIG. 3. Particularly, method 400 begins at 401 when WDM 305 requests one or more workspace management policies from remote service 303. At 403, remote service 302 sends the requested policies to WDM 305.

At 403A-N, WMD agents 308A-N each send a connection request to WDM 305. At 404A-N, WDM 305 distributes applicable workspace management policies to WMD agents 308A-N. At 405, WMD 305 identifies which of IHS 100A-N it can offer peripheral device connections to based upon an applicable workspace management policy. Such a policy may include, for example, an electronic file of any suitable format (e.g., JSON, XML, etc.) containing one or more contextual rules that, upon enforcement, cause an IHS to perform selected responsive actions.

At 406A-N, WMD 305 connects to the identified ones of IHSs 100A-N. At 407, WMD 305 creates one or more workspaces (e.g., sets of peripheral devices and/or features thereof available to a client IHS via WDM 301) according to an applicable workspace management policy. At 407, WDM 305 determines which peripheral device(s) and/or feature(s) thereof to make available (or unavailable) to each of IHS 100A-N executing WMD agents 308A-N based on applicable workspace management polic(ies).

At 408A-N, WDM 305 enables functions and/or features of selected peripheral devices for each of IHSs 100A-N. At 410, as part of runtime operations 409A-N, each of IHSs 100A-N sends their respective telemetry data to remote service 303. Still during runtime operations 409A-N, at 415A-N each of IHSs 100A-N sends hotkeys and/or end connection commands to WDM 305, for example, at the end of a user's session. At 411, WDM 305 sends telemetry data to remote service 303.

Connection detection loop 412 includes state change detection routine 413 that receives one or more of: a policy modification indication 414 from remote service 303, a hotkey and/or end connection command 415A-N from at least of client IHSs 100A-N, a network connection modification indication 416 from at least of client IHSs 100A-N, or a hardware modification indication 417 from at least of client IHSs 100A-N. In response to a detected change, state change detection routine 413 returns to control to 405 such that a new workspace management policy or set of policies may be selected according to the state change.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A Workspace Managing Device (WMD), comprising:
a processor; and
a memory coupled to the processor, the memory configured with program instructions stored thereon that, upon execution, cause the WMD to:
  receive a first request from a first client Information Handling System (IHS) to access a peripheral device coupled to the WMD;
  receive a second request from a second IHS to access the peripheral device coupled to the WMD;
  identify a workspace management policy applicable to at least one of: the first request, the second request, the peripheral device, the first client IHS, the second client IHS, a user of the first client IHS, or a user of the second client IHS;
  establish secure communications between (i) a respective WMD agent configured to execute on each of the first client IHS and the second client IHS and (ii) a Workspace Device Manager (WDM) of the WMD based at least in part on one or more key exchange processes or other cryptographic techniques, wherein the WDM comprises a manageability policy and encryption key manager module;
  perform, via the secure communications, IHS and/or WMD verification and assertion operations; and
  manage access to the peripheral device by the first client IHS and the second client IHS, wherein the WMD allows the first client IHS access to at least one hardware feature of the peripheral device while the WMD denies access by the second client IHS to the at least one hardware feature of the peripheral device based, at least in part, upon the workspace management policy and context information that comprises a proximity of the user of the first client IHS or a proximity of the user of the second client IHS to the WMD.

2. The WMD of claim 1, wherein the WMD comprises at least one of a dock or a display, wherein the workspace management policy is received by the dock or the display from a remote service, and wherein the remote service comprises a repository of workspace management policies and IT tools for distribution of such policies to relevant WMDs.

3. The WMD of claim 1, wherein to identify the workspace management policy, the program instructions, upon execution, further cause the WMD to select the workspace management policy among a plurality of policies based upon the context information.

4. The WMD of claim 3, wherein the context information further comprises at least one of: a type of WMD, a location of the WMD, or a service tag of the WMD.

5. The WMD of claim 3, wherein the context information further comprises at least one of: a type of client IHS, a service tag of the client IHS, a posture of the client IHS, an identity of the user of the first client IHS, or an identity of the user of the second client IHS.

6. The WMD of claim 3, wherein the context information further comprises an indication of whether the peripheral device is accessible to at least one other client IHS.

7. The WMD of claim 3, wherein the context information further comprises a type of workload executed by the first client IHS or the second client IHS.

8. The WMD of claim 7, wherein the type of workload comprises at least one of: a software-based container or a hardware-based container.

9. The WMD of claim 1, wherein the program instructions, upon execution, further cause the WMD to allow access to a first feature of the peripheral device and to deny access to a second feature of the peripheral device, and wherein at least one of the first or second features comprises at least one of: a network connection or a type of hard drive access operation.

10. The WMD of claim 1, wherein the program instructions, upon execution, further cause the WMD to, in response to a determination of whether the first client IHS or the second client IHS is a work IHS or a personal IHS, grant or deny access to the peripheral device.

11. The WMD of claim 1, wherein the program instructions, upon execution, further cause the WMD to, in response to a determination of whether the first client IHS or the second client IHS is a work IHS or a personal IHS, provide restricted access to the peripheral device.

12. The WMD of claim 1, wherein the peripheral device comprises at least one of: a display, a mouse, a keyboard, a hard drive, a microphone, or a camera.

13. The WMD of claim 1, wherein the first request or the second request further comprises a request to access any or all peripheral devices coupled to the WMD, and wherein to manage access to the peripheral device, the program instructions, upon execution, further cause the WMD to select a subset of all peripheral devices coupled to the WMD made at least partially accessible to the first client IHS while the WMD denies access by the second IHS to the selected subset, in response to enforcement of the workspace management policy against the context information.

14. A non-transitory memory storage device configured with program instructions stored thereon that, upon execution by a first Information Handling System (IHS), cause the first IHS to:
  receive a request from a second IHS to access a peripheral device coupled to the first IHS;
  manage access to the peripheral device, wherein the first IHS is allowed access to a feature of the peripheral device and the first IHS is configured to deny access by the second IHS to the feature of the peripheral device, based at least in part on a workspace management policy and context information that comprises a proximity of a user of the second IHS to the first IHS, wherein manage access further comprises establish secure communications between (i) a WMD agent executed on the second IHS and (ii) a Workspace Device Manager (WDM) executed on the first IHS based at least in part on one or more key exchange processes or other cryptographic techniques, and wherein the WDM comprises a manageability policy and encryption key manager module; and
  perform, via the secure communications, IHS and/or WMD verification and assertion operations, wherein in response to detection of a connection state change indication from the second IHS, the first IHS is configured to select a new workspace management policy determined based on the context information and the state change indication, the state change indication comprising one or more of: a hotkey command, or a hardware modification indication, and wherein in response to the new workspace management policy, the first IHS is configured to allow the second IHS access to the feature of the peripheral device.

15. The non-transitory memory storage device of claim 14, wherein the workspace management policy is configured to identify a level of access granted to the second IHS with respect to the peripheral device based upon the context information.

16. A method, comprising:

receiving, at a Workspace Managing Device (WMD), a workspace management policy;

establishing secure communications between (i) a respective WMD agent executing on each of a plurality of client Information Handling Systems (IHS) and (ii) a Workspace Device Manager (WDM) of the WMD using one or more key exchange processes or other cryptographic techniques, wherein the WDM comprises a manageability policy and encryption key manager module;

performing, via the secure communications, IHS and/or WMD verification and assertion operations; and managing access to a plurality of peripheral devices by the plurality of client IHSs by the WMD based upon the received workspace management policy that identifies a level of access granted to at least one of the plurality of client IHSs with respect to at least one peripheral device of the plurality of peripheral devices, wherein managing access further comprises allowing access by at least one client IHS of the plurality of client IHSs to a feature of at least one peripheral device of the plurality of peripheral devices based on context information that comprises a proximity of a user to the at least one client IHS of the plurality of client IHSs, and denying access by at least one other client IHS of the plurality of client IHSs to the feature of the at least one peripheral device of the plurality of peripheral devices based on context information that comprises a proximity of at least one other user to the at least one other client IHS of the plurality of client IHSs, wherein in response to receiving a connection state change indication from the at least one other client IHS of the plurality of client IHSs, the WMD selects a new workspace management policy determined based on the proximity of the at least one other user to the at least one other client IHS of the plurality of client IHSs, and wherein in response to the new workspace management policy, the WMD allows access by the at least one other client IHS to the feature of the at least one peripheral device of the plurality of peripheral devices.

17. The method of claim 16, wherein the context information comprises an indication of whether a workload executed by the at least one of the plurality of client IHSs comprises a software-based container or a hardware-based container.

\* \* \* \* \*